(12) United States Patent
Ozawa

(10) Patent No.: US 7,940,515 B2
(45) Date of Patent: May 10, 2011

(54) SOLID ELECTROLYTIC CAPACITOR

(75) Inventor: Masato Ozawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 291 days.

(21) Appl. No.: 12/300,218

(22) PCT Filed: Jul. 5, 2007

(86) PCT No.: PCT/JP2007/063461
§ 371 (c)(1),
(2), (4) Date: Nov. 10, 2008

(87) PCT Pub. No.: WO2008/010422
PCT Pub. Date: Jan. 24, 2008

(65) Prior Publication Data
US 2009/0195966 A1   Aug. 6, 2009

(30) Foreign Application Priority Data
Jul. 19, 2006   (JP) .................. 2006-196359

(51) Int. Cl.
*H01G 9/00*   (2006.01)
(52) U.S. Cl. ........ 361/523; 361/516; 361/519; 361/525; 361/528; 361/529
(58) Field of Classification Search .......... 361/523, 361/516–519, 525–529, 530–531, 540–541; 29/25.01, 25.03
See application file for complete search history.

(56) References Cited

U.S. PATENT DOCUMENTS

| 6,556,427 B2 * | 4/2003 | Ohata et al. ............... 361/523 |
| 6,876,083 B2 * | 4/2005 | Yano et al. ............... 257/764 |
| 2002/0001168 A1 | 1/2002 | Ohata et al. |
| 2006/0076541 A1 | 4/2006 | Yoshida et al. |
| 2008/0316679 A1 * | 12/2008 | Sugihara et al. ............... 361/504 |

FOREIGN PATENT DOCUMENTS

| JP | 3-215922 | 9/1991 |
| JP | 7-201671 | 8/1995 |
| JP | 10-32415 | 2/1998 |
| JP | 2001-274040 | 10/2001 |
| JP | 2005-85947 | 3/2005 |
| JP | 2006-186292 | 7/2006 |
| WO | 2005/014692 | 2/2005 |

OTHER PUBLICATIONS

International Search Report issued Aug. 7, 2007 in the International (PCT) Application of which the present application is the U.S. National Stage.
Partial English translation of JP 3-215922A, Sep. 1991.

* cited by examiner

*Primary Examiner* — Nguyen T Ha
(74) *Attorney, Agent, or Firm* — Wenderoth, Lind & Ponack, L.L.P.

(57) ABSTRACT

A solid electrolytic capacitor includes an anode body made of valve metal, a dielectric oxide layer provided on the anode body, and a conductive layer provided on the carbon layer. The carbon layer contains carbon and aromatic compound having sulfonic acid radical. This solid electrolytic capacitor has a small equivalent series resistance.

6 Claims, 2 Drawing Sheets

Fig. 2

| | Initial Characteristics | | | After High-Temperature, No-Load Test | | | |
|---|---|---|---|---|---|---|---|
| | Capacitance (μF) | Leakage Current (μA) | ESR (Ω) | Capacitance (μF) | Leakage Current (μA) | ESR (Ω) | Changing Rate of ESR |
| Example 1 | 33.3 | 0.4 | 11.4 | 30.1 | 0.3 | 18.9 | 1.66 |
| Example 2 | 33.1 | 0.3 | 11.4 | 30.2 | 0.3 | 22.2 | 1.95 |
| Example 3 | 33.4 | 0.4 | 11.5 | 30.5 | 0.3 | 21.3 | 1.85 |
| Example 4 | 33.1 | 0.3 | 12.5 | 30.4 | 0.2 | 19.1 | 1.53 |
| Example 5 | 33.3 | 0.3 | 12.9 | 30.5 | 0.3 | 20.0 | 1.55 |
| Example 6 | 33.5 | 0.3 | 13.3 | 30.1 | 0.3 | 19.2 | 1.44 |
| Example 7 | 33.2 | 0.3 | 11.6 | 30.1 | 0.2 | 24.3 | 2.09 |
| Example 8 | 33.8 | 0.3 | 12.6 | 30.2 | 0.3 | 22.7 | 1.80 |
| Example 9 | 34.1 | 0.3 | 12.1 | 30.4 | 0.3 | 13.6 | 1.12 |
| Example 10 | 31.8 | 0.5 | 13.5 | 30.8 | 0.4 | 11.2 | 1.05 |
| Comparative Example 1 | 33.4 | 0.4 | 22.4 | 23.1 | 0.3 | 148.1 | 8.05 |
| Comparative Example 2 | 33.0 | 0.3 | 13.5 | 28.6 | 0.3 | 42.0 | 3.11 |

SOLID ELECTROLYTIC CAPACITOR

TECHNICAL FIELD

The present invention relates to a solid electrolytic capacitor using solid electrolyte made of conductive polymer.

BACKGROUND ART

Digital devices have recently been developed, and accordingly have required capacitors to have low impedance and excellent high-frequency characteristics. JP 10-32415A discloses a conventional solid electrolytic capacitor. This capacitor includes an anode body including a porous sintered body made of powder of valve metal, such as tantalum, aluminum, or titanium, foil of the valve metal, and an anode lead made of the valve metal. A dielectric oxide layer is provided on a surface of the anode body by anodizing. A solid electrolytic layer made of conductive polymer, such as polypyrrole, polythiophene, polyaniline, or polyfuran, is formed on the dielectric oxide layer. Then, a cathode layer is formed on the solid electrolytic layer, thus providing a capacitor element. The cathode layer includes a carbon layer made of graphite, and a conductive layer made of silver paste provided on the carbon layer.

The anode lead of the capacitor element is welded to an anode terminal, and the cathode layer is bonded to a cathode terminal with conductive adhesive. The capacitor element is covered with package resin to expose respective portions of the anode terminal and the cathode terminal from a surface of the resin, thus providing the solid electrolytic capacitor. The solid electrolytic layer made of conductive polymer having a small resistance reduces an equivalent series resistance (ESR) of the capacitor.

In this capacitor, the solid electrolyte layer made of conductive polymer does not strongly adhere to the carbon layer, and may allow the carbon layer to be peeled off in high temperatures, thereby increasing a resistance of the interface between the solid electrolyte layer and the carbon layer.

Upon being peeled off from the solid electrolyte layer, the carbon layer allows oxygen to enter from the outside of the capacitor and to have the conductive polymer of the solid electrolyte deteriorate. This may increase a resistance of the conductive polymer, accordingly increasing the ESR of the capacitor.

SUMMARY OF THE INVENTION

A solid electrolytic capacitor includes an anode body made of valve metal, a dielectric oxide layer provided on the anode body, and a conductive layer provided on the carbon layer. The carbon layer contains carbon and aromatic compound having sulfonic acid radical.

This solid electrolytic capacitor has a small equivalent series resistance.

BRIEF DESCRIPTION OF THE DRAWINGS

FIG. 2 illustrates an evaluation result of the solid electrolytic capacitors in accordance with the embodiment.

DETAILED DESCRIPTION OF THE PREFERRED EMBODIMENT

Figure 1:
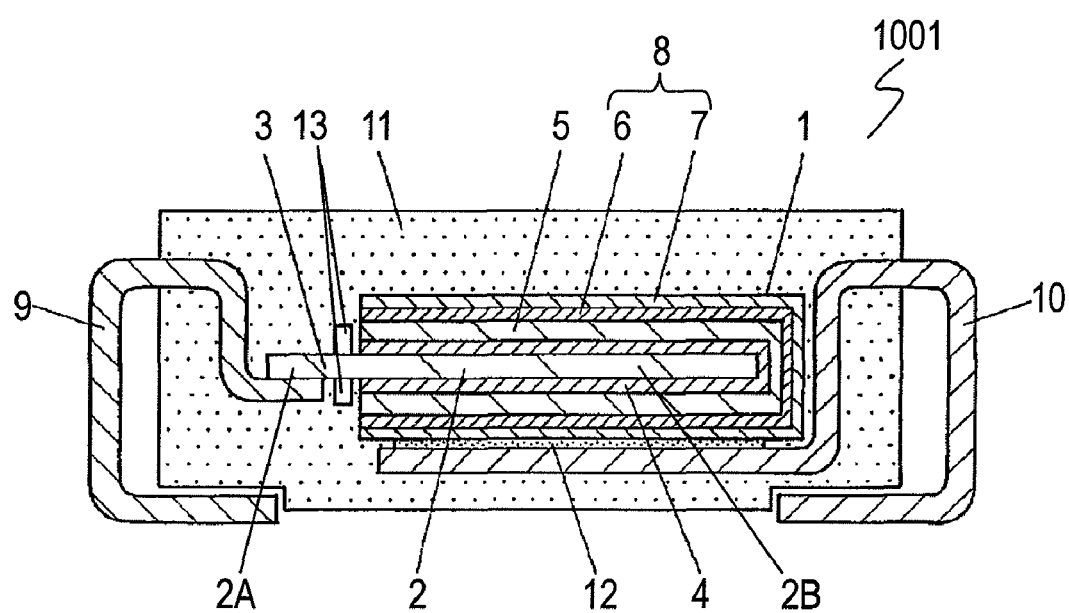
FIG. 1 is a sectional view of a solid electrolytic capacitor in accordance with an exemplary embodiment of the present invention.

FIG. 1 is a sectional view of solid electrolytic capacitor 1001 in accordance with an exemplary embodiment of the present invention. Solid electrolytic capacitor 1001 includes capacitor element 1. Capacitor element 1 includes anode body 2, anode lead 3, dielectric oxide layer 4, solid electrolytic layer 5, and conductive layer 7.

Anode body 2 is made of valve metal foil. Anode lead 3 is provided at end portion 2A of anode body 2. Dielectric oxide layer 4 is provided at end portion 2B. Solid electrolytic layer 5 made of conductive polymer is provided on a surface of dielectric oxide layer 4. Insulating resist 13 separates end portion 2A of anode body 2 from end portion 2B.

Anode body 2 may include a porous sintered body made of powder of valve metal, such as tantalum, aluminum, or titanium, and a lead wire which is made of valve metal and which is embedded in the porous sintered body. This lead wire functions as anode lead 3.

Cathode layer 8 is provided on a surface of solid electrolytic layer 5, thus providing capacitor element 1. Cathode layer 8 includes carbon layer 6 provided on a surface of solid electrolytic layer 5 and conductive layer 7 provided on carbon layer 6. Carbon layer 6 mainly contains carbon, and contains aromatic compound having sulfonic acid radical. Conductive layer 7 is made of conductive paste including conductive particles, such as silver particles or nickel particles, and medium, such as epoxy resin. The conductive paste is applied onto carbon layer 6 and hardened, thereby providing conductive layer 7.

Anode terminal 9 is welded to anode lead 3 of capacitor element 1. Cathode layer 8 is bonded to cathode terminal 10 with conductive adhesive 12. Capacitor element 1 is covered with package resin 11 made of insulating resin, such as epoxy resin, such that at least respective portions of anode terminal 9 and cathode terminal 10 are exposed from surfaces of the package resin, thus providing solid electrolytic capacitor 1001.

The conductive polymer of solid electrolytic layer 5 is made of polymeric monomer selected from heterocyclic monomer, such as pyrrole, thiophene, aniline, furan or derivatives of these monomers, such as 3,4-ethylene dioxythiophene, and formed by an electrolytic polymerization method or a chemical oxidizing polymerization method.

In the electrolytic polymerization method, anode body 2 having dielectric oxide layer 4 provided on a surface thereof is immersed into polymerized solution containing polymeric monomer and dopant, and then, has electric power fed thereto, thereby forming solid electrolytic layer 5 made of conductive polymer.

In the chemical oxidizing polymerization method, anode body 2 having dielectric oxide layer 4 provided a surface thereof is immersed into polymerized solution containing polymeric monomer, and then, is immersed into mixture solution containing dopant and oxidant, or into compound solution containing dopant and oxidant, thereby forming solid electrolytic layer 5 made of conductive polymer.

Aromatic compound including at least one of carboxyl radical and sulfonic acid radical is used as the dopant.

This aromatic compound including sulfonic acid radical used as the dopant may be selected from compound, such as benzensulfonic acid, p-toluenesulfonic acid, naphthalensulfonic acid, butyl-naphthalensulfonic acid, phenol-sulfonic acid, sulfosalicylinic acid, sulfonic benzoic acid, naphthalendisulfonic acid, benzene-disulfonic acid, or anthraquinone-disulfonic acid, derivatives of the above compounds, or salt compound, such as sodium salt, potassium salt, or ammonium salt, of the above compounds.

The aromatic compound including carboxyl radical used as the dopant may be selected from compound, such as sulfonic benzonic acid, phthalic acid, sulfophthalic acid, or hydroxy-benzonic acid, derivatives of the above compounds, or salt compound, such as sodium salt, potassium salt, or ammonium salt of the above compounds.

The oxidant may be ferric salt, persulfate salt, permanganate salt, or hydrogen peroxide. The ferric salt may be ferric sulfate or ferric salt with dopant, such as p-toluensulfonic acid, butyl-naphthalensulfonic acid, or anthraquinone-sulfonic acid.

Solid electrolytic layer 5 may be made of solvable conductive polymer, such as polyaniline, having an imino-p-phenylen structure.

The carbon of carbon layer 6 may be selected from graphite, carbon black, or black lead.

Carbon layer 6 is formed by a method using carbon paste or a method using water solution of carbon.

In the method using the water solution of carbon, water solution which contains 2 to 10 wt % of carbon dispersed therein and compound mixed and solved therein is prepared. The compound is at least one compound selected from aromatic compounds having sulfonic acid radical. The water solution of carbon may further contain surface active agent in order to solve the aromatic compound having the sulfonic acid radical, or may further contain monovalent alcohol, such as methanol, ethanol, or isopropyl alcohol. Anode body 2 having dielectric oxide layer 4 and solid electrolytic layer 5 accompanied therewith are immersed into the water solution of carbon, thereby applying the water solution onto a surface of solid electrolytic layer 5. The water solution may be applied onto solid electrolytic layer 5 by allowing a roller or a sponge holding the water solution to contact solid electrolytic layer 5. The water solution of carbon applied to solid electrolytic layer 5 is then dried at a temperature ranging from 130° C. to 250° C., thereby providing carbon layer 6.

In the method using the carbon paste, the carbon paste which contains organic solvent, organic binder, 20 to 90 wt % of carbon, and a compound is prepared. The organic solvent is made of butyl acetate, alcohol, or keton. The organic binder is acrylic resin, polyester resin, epoxy resin, urethane resin, or acetate vinyl resin. The compound is at least one compound selected from aromatic compounds having sulfonic acid radical. This carbon paste is applied onto solid electrolytic layer 5, and then hardened at a high temperature, thus providing carbon layer 6.

The aromatic compound having sulfonic acid radical and contained in carbon layer 6 may be selected from the compounds of benzensulfonic acid, p-toluenesulfonic acid, naphthalensulfonic acid, butyl-naphthalenesulfonic acid, derivatives of the above compounds, and salt compound, such as sodium salt, potassium salt, and ammonium salt of the above compounds.

The aromatic compound having the sulfonic acid radical may be selected preferably from compounds having at least one sulfonic acid radical in polyvalent phenol, e.g. catechol, resorcin, hydroquinone, pyrogallol, phloroglucin, each having plural hydroxy radicals, or selected from derivatives of the above compounds, or from salt compounds of the above compounds. For instance, hydroquinone sulfonic acid, hydroquinonedisulfonic acid, catechol sulfonic acid, catechol disulfonic acid, pyrogallolsulfonic acid, or pyrogalloldisulfonic acid may be used as the aromatic compound.

The polyvalent phenol having the sulfonic acid radical contained in carbon layer 6 allows solid electrolytic layer 5 made of conductive polymer to strongly adhere onto carbon layer 6.

Carbon layer 6 preferably contains 10 to 300 parts by weight of the aromatic compound having sulfonic acid radical with respect to 100 parts by weight of carbon, and more preferably contains 30 to 150 parts by weight of the aromatic compound. If the aromatic compound is contained at less than 10 parts by weight, carbon layer 6 cannot be formed homogeneously on the surface of solid electrolytic layer 5. If the aromatic compound is contained at more than 300 parts by weight, a resistance of carbon layer 6 becomes large and increases an equivalent series resistance (ESR) of solid electrolytic capacitor 1001 accordingly.

The solid electrolytic capacitor, including solid electrolytic layer 5 formed of conductive polymer which contains benzene compound particularly out of the aromatic compounds having at least one of carboxyl radical and sulfonic acid as the dopant, has an ESR varying in a smaller amount at a high temperature than another solid electrolytic capacitor including solid electrolytic layer 5 including heterocyclic aroma compound.

Solid electrolytic capacitor 1001 in accordance with the embodiment has a small ESR prevented from increasing at high temperatures, thus having high reliability.

Examples of capacitor 1001 will be described below.

Example 1

Aluminum foil having a thickness of 100 μm had a surface area enlarged by etching to 125 times to provide anode body 2. An insulating resist tape was attached onto anode body 2 to provide resist 13 separating anode body 2 into end portion 2A and end portion 2B. Anode lead 3 was provided at end portion 2A. A cathode section having dimensions of 3.2 mm by 3.9 mm was provided at end portion 2B.

Then, while the cathode section (end portion 2B) of anode body 2 was immersed into water solution containing 0.3 wt % of ammonium dihydrogen phosphate and having a temperature of 70° C., a direct-current voltage of 12V was applied to the cathode section for 20 minutes to form an anodized film on anode body 2.

Then, the anodized film was immersed into water solution containing 20 w % of manganese nitrate and having a temperature of 25° C. for 3 seconds, was taken out from the water solution, and was heated at a temperature of 300° C. for 5 minutes to be decomposed, thereby providing a manganese oxide layer on the surface of the anodized film.

While the manganese oxide layer was in polymerizing solution, a positive electrode was placed close to the manganese oxide layer, and a negative electrode was placed to face the positive electrode in the polymerized solution. The polymerizing solution contained 0.5 mol/L of polymeric monomer and 0.1 mol/L of dopant which were mixed in organic solvent. The polymeric monomer was pyrrole monomer, heterocyclic monomer. The dopant was sulfosalicylic acid. A voltage was applied to produce a voltage of 3V between the positive electrode and the negative electrode to perform electrolytic polymerization. Thereby, solid electrolytic layer 5 made of conductive polymer was formed on dielectric oxide layer 4.

Then, water solution of carbon containing 4 wt % of graphite and 100 parts by weight of sodium catechol-disulfonic acid with respect to 100 parts by weight of the graphite was prepared. Then solid electrolytic layer 5 was impregnated into the water solution of carbon, and then, solid electrolytic layer 5 was dried at a temperature ranging from 130 to 180° C. for a period ranging from 10 to 30 minutes, thereby forming carbon layer 6 on the surface of solid electrolytic layer 5.

Carbon layer 6 included 100 parts by weight of graphite and 100 parts by weight of sodium catechol-disulfonic acid. The graphite was dispersed homogeneously in carbon layer 6.

Then, conductive paste including Ag filler and epoxy-based binder resin was applied onto carbon layer 6 and hardened at a temperature ranging from 150 to 200° C. for a period ranging from 10 to 60 minutes to form conductive layer 7, thus producing capacitor element 1 having a capacitance of 33 μF.

Examples 2 to 6

Various kinds of water solution containing various compositions of aromatic compounds to produce carbon layer 6 was prepared to produce examples 2 to 6 of capacitor elements 1 similarly to example 1.

Carbon layers 6 of examples 2 to 6 were formed by using water solutions of carbon prepared by dissolving sodium catechol-disulfonic acid in water solution of carbon containing 4 wt % of graphite. Carbon layers of examples 2 to 6 were formed by using the water solution of carbon containing, with respect to 100 parts by weight of the graphite, 10, 30, 150, 200, and 300 parts by weight of sodium catechol-disulfonic acid, respectively.

Examples 7 and 8

Various kinds of water solution containing various compositions of aromatic compounds to produce carbon layer 6 were prepared to produce examples 7 and 8 of capacitor elements 1 similarly to example 1.

Carbon layer 6 of example 7 was produced by using water solution of carbon prepared by dissolving sodium p-phenol sulfonic acid into water solution containing 4 wt % of graphite. The water solution of carbon contains 30 parts by weight of sodium p-phenol sulfonic acid with respect to 100 parts by weight of graphite.

Carbon layer 6 of example 8 was produced by using water solution of carbon prepared by dissolving sodium 6-hydroxy-2-naphthalene sulfonic acid into water solution containing 4 wt % of graphite. Carbon layer 6 contains 30 parts by weight of sodium 6-hydroxy-2-naphthalene sulfonic acid with respect to 100 parts by weight of graphite.

Examples 9 and 10

Each of capacitor elements 1 of examples 9 and 10 included solid electrolytic layer 5 produced by using polymerizing solution prepared by mixing polymeric monomer, dopant different from that used for example 1 with organic solvent.

Capacitor element 1 of example 9 was produced by using the polymerizing solution prepared by mixing 0.4 mol/L of pyrrole monomer and 0.1 mol/L of naphthalene-sulfonic acid with the organic solvent.

Capacitor element 1 of example 10 was produced by using the polymerizing solution prepared by mixing 0.2 mol/L of 3,4-ethylene-dioxy-thiophene and 0.2 mol/L of naphthalene-sulfonic acid with the organic solvent.

Comparative Examples 1 and 2

Capacitor elements of comparative examples 1 and 2 included carbon layers different from the carbon layer of example 1.

The carbon layer of the capacitor element of comparative example 1 was produced by using the water solution containing 1 wt % of graphite.

The carbon layer of the capacitor element of comparative example 2 was produced by using water solution of carbon prepared by dissolving catechol into in water solution containing 4 wt % of graphite. The water solution of carbon contained 100 parts by weight of catechol with respect to 100 parts by weight of graphite.

FIG. 2 illustrates characteristics of solid electrolytic capacitors 1001. Capacitances, ESRs, and leakage currents of the capacitors were measured immediately after the capacitor elements of examples 1 to 10 and comparative examples 1 and 2. These measurements are shown in FIG. 2 as an initial capacitance, an initial ESR, and an initial leakage current. Then, a high-temperature and no-load test was performed for the capacitor elements, in which the capacitor elements were left at a temperature of 125° C. for 500 hours with no load. Then, the capacitance, the ESR, and the leakage current which were measured are shown in FIG. 2. The ratio of the initial ESR to the ESR measured after the test is listed in FIG. 2 as a changing rate of the ESR.

The capacitances of the capacitor elements of examples 1 to 10 and comparative examples 1 and 2 were measured at a temperature ranging from 25 to 30° C. at a frequency of 120 Hz. The leakage currents of the capacitor elements were measured at a temperature ranging from 25 to 30° C. one minute after applying a voltage of 2.5V to the capacitor elements. The ESRs of the capacitor elements were measured at a temperature ranging from 25 to 30° C. at a frequency of 100 kHz. The measurement of each characteristic listed in FIG. 2 is an average value of 30 samples.

As shown in FIG. 2, capacitor elements 1 of examples 1 to 10 have initial ESRs smaller than the ESR of comparative example 1, and have the ESRs which increase less than the ESR of comparative example 1 after being left at the temperature of 125° C. with no load for 1000 hours.

Capacitor elements 1 of examples 1 to 6 have initial ESRs substantially identical to the initial ESR of comparative example 2, but have the ESRs which increase less than the ESR of comparative example 2 after being left at the temperature of 125° C. for 500 hours, thus having lower changing rates of the ESRs than the changing rate of the ESR of comparative example 2.

The aromatic compound having sulfonic acid radical contained in carbon layer 6 allows solid electrolytic layer 5 to strongly adhere to carbon layer 6, accordingly decreasing the ESR. This strong adhesion prevents carbon layer 6 from being peeled off from solid electrolytic layer 5, thereby preventing oxygen from entering into solid electrolytic layer 5. This prevents the conductive polymer of solid electrolytic layer 5 from deteriorating, thereby decreasing the ESR.

A solid electrolytic capacitor according to the present invention has a small equivalent series resistance.

The invention claimed is:

1. A solid electrolytic capacitor comprising:
an anode body made of valve metal;
a dielectric oxide layer provided on the anode body;
a solid electrolytic layer provided on the dielectric oxide layer and made of conductive polymer;
a carbon layer provided on the solid electrolytic layer, the carbon layer containing carbon and aromatic compound having sulfonic acid radical; and
a conductive layer provided on the carbon layer.

2. The solid electrolytic capacitor of claim 1, wherein the carbon layer includes polyvalent phenol as the aromatic compound.

3. The solid electrolytic capacitor of claim 2, wherein the carbon layer contains 10 to 300 parts of the aromatic compound and 100 parts by weight of carbon.

4. The solid electrolytic capacitor of claim 1, wherein the carbon layer contains 10 to 300 parts of the aromatic compound and 100 parts by weight of carbon.

5. The solid electrolytic capacitor of claim 1, wherein the solid electrolytic layer contains the aromatic compound including at least one of carboxyl radical and sulfonic acid radical.

6. The solid electrolytic capacitor of claim 1, wherein the carbon of the carbon layer is graphite, carbon black, or black lead.

* * * * *